US007725819B2

(12) United States Patent
Fenton

(10) Patent No.: US 7,725,819 B2
(45) Date of Patent: *May 25, 2010

(54) NON-REPUDIABLE TRANSLATION OF ELECTRONIC DOCUMENTS

(75) Inventor: Charles S. Fenton, Ypsilanti, MI (US)

(73) Assignee: Sterling Commerce, Inc., Dublin, OH (US)

( * ) Notice: Subject to any disclaimer, the term of this patent is extended or adjusted under 35 U.S.C. 154(b) by 1215 days.

This patent is subject to a terminal disclaimer.

(21) Appl. No.: 11/213,101

(22) Filed: Aug. 26, 2005

(65) Prior Publication Data

US 2005/0283439 A1    Dec. 22, 2005

Related U.S. Application Data

(63) Continuation of application No. 10/052,176, filed on Jan. 16, 2002, now Pat. No. 6,938,014.

(51) Int. Cl.
    *G06F 17/00* (2006.01)
(52) U.S. Cl. ............... 715/249; 715/236; 715/234; 715/255; 713/176; 713/168
(58) Field of Classification Search ......... 715/255–256, 715/234, 200, 246, 236; 713/176, 150, 181, 713/168, 175
    See application file for complete search history.

(56) References Cited

U.S. PATENT DOCUMENTS

| 3,293,618 | A | | 12/1966 | Klein | ............ 710/3 |
|---|---|---|---|---|---|
| 5,018,196 | A | * | 5/1991 | Takaragi et al. | ............ 380/30 |
| 6,253,323 | B1 | * | 6/2001 | Cox et al. | ............ 713/176 |
| 6,341,349 | B1 | * | 1/2002 | Takaragi et al. | ............ 713/168 |
| 6,351,844 | B1 | | 2/2002 | Bala | ............ 717/128 |
| 6,490,603 | B1 | | 12/2002 | Keenan et al. | ............ 715/513 |
| 6,493,709 | B1 | * | 12/2002 | Aiken | ............ 707/4 |
| 6,938,014 | B1 | * | 8/2005 | Fenton | ............ 705/50 |
| 2001/0016940 | A1 | * | 8/2001 | Davis et al. | ............ 717/5 |
| 2003/0018661 | A1 | * | 1/2003 | Darugar | ............ 707/500 |
| 2004/0123111 | A1 | * | 6/2004 | Makita et al. | ............ 713/176 |

\* cited by examiner

*Primary Examiner*—Thu Huynh
(74) *Attorney, Agent, or Firm*—Jackson Walker L.L.P.

(57) ABSTRACT

A method for non-repudiable translation of documents is disclosed, whereby a computer application determines a storage location for a first document, generates a first digital signature for the first document, determines a storage location for a plurality of translation instructions, generates a second digital signature for the plurality of translation instructions, translates the first document, assembles a second document including the storage location for the first document, the storage location for the plurality of translation instructions, the first digital signature, the second digital signature, the translation, and at least one encryption key associated with the first document and the plurality of translation instructions, and digitally signs the second document. The signed document includes sufficient information to demonstrate non-repudiable translation of the first document.

16 Claims, 2 Drawing Sheets

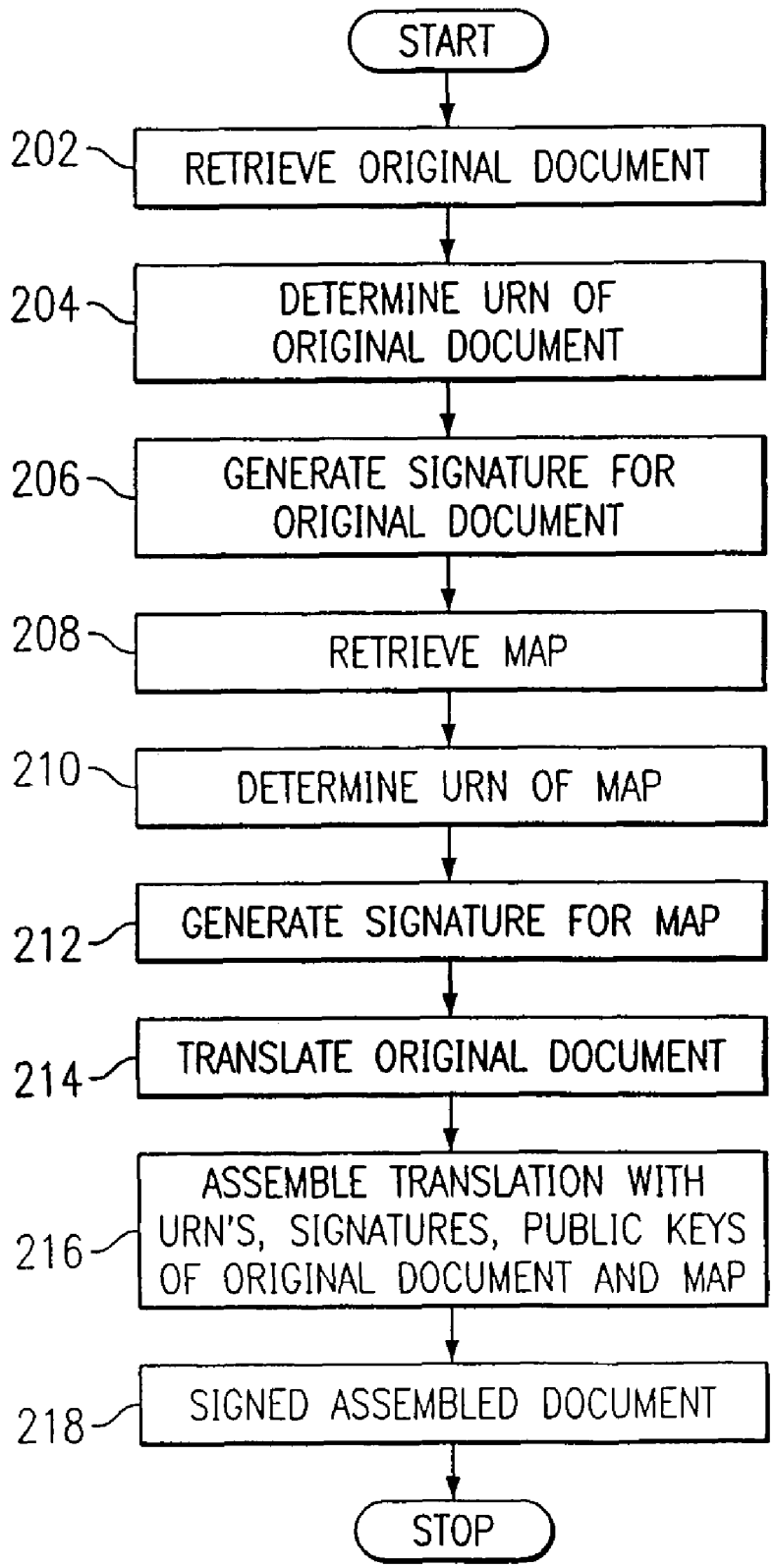

NON-REPUDIABLE TRANSLATION OF ELECTRONIC DOCUMENTS

RELATED APPLICATIONS

This application is a continuation of U.S. application Ser. No. 10/052,176, filed Jan. 16, 2002, now U.S. Pat. No. 6,938,014 entitled "Non-Repudiable Translation of Electronic Documents, which claims the benefit of priority, under 35 U.S.C. §120, from U.S. application Ser. No. 10/012,975 filed Dec. 7, 2001.

TECHNICAL FIELD OF THE INVENTION

The present invention relates in general to electronic transfer of information and, in particular, but not exclusively, to computer-implemented, non-repudiable translation of electronic documents.

BACKGROUND OF THE INVENTION

Electronic-business (e-business) is the process of using Internet-related and computer technologies to improve business operations. An important e-business function is the secure and efficient transfer of documents between entities in electronic form. In this regard, an established component of e-business operations is the computer-implemented translation of electronic documents being sent and received.

The computer applications that undergrid e-business operations are capable of producing and accepting electronic documents in accordance with agreed upon standards, conventions, and protocols. However, in most business environments there are no universal formats to which all such documents may adhere. Consequently, before electronic documents may be transferred from one application to another, the documents are translated from a form acceptable to the first application to another form acceptable to the second application.

For a practical example, in the health-care industry, care providers (e.g., physicians, medical clinics, hospitals, etc,) are required to send certain information to insurance companies about the health-care services provided to insured patients. However, in order to reduce waste, fraud, and abuse in health insurance and health care delivery, the Federal Health Insurance Portability and Accountability Act (HIPAA) of 1996 sets forth the U.S. Government's guidelines for the administration of health insurance and health-care services. In particular, HIPAA specifies how medical documents including patient information are to be handled. Basically, HIPAA specifies that all patient information must not be made public. Consequently, in providing health insurance and health-care services, the privacy of patient information included in documents has to be maintained.

If, for example, patient information is to be conveyed from a care provider to an insurer in electronic form, the care provider typically has to translate the data format of the electronic document to be conveyed to the data format used by the insurer. The translation process changes the data format and/or syntax of the first application's (original) document to that of the second application's (resulting) document. Since HIPAA specifies that the privacy of the conveyed information is to be maintained, it is important to track how the document was handled during the translation process. In other words, an audit trail including the translation process should be maintained. For audit purposes (e.g., if a question arises about the validity of the health-care information in the translated document), the original document and the map (set of instructions used by translator program) for translating the original document to the resulting document may be maintained. Nevertheless, a significant problem with previous electronic document translation techniques is that they do not assure a recipient of a translated document that it can be non-repudiably tied to the original document and/or to the map used for the original document's translation (i.e., "non-repudiable" in the sense that the recipient may not deny ownership of the resulting document). Consequently, there is no way for a recipient (e.g., e-business partner, auditor, etc.) to explicitly or legally tie the original and resulting documents together, or otherwise demonstrate the validity of the translation process.

BRIEF DESCRIPTION OF THE DRAWINGS

For a more complete understanding of the present invention and its advantages, reference is now made to the following descriptions, taken in conjunction with the accompanying drawings, in which:

FIG. 3 illustrates an example method that may be used for non-repudiable translation of electronic documents, in accordance with one example embodiment of the present invention.

DETAILED DESCRIPTION OF THE INVENTION

Figure 1:
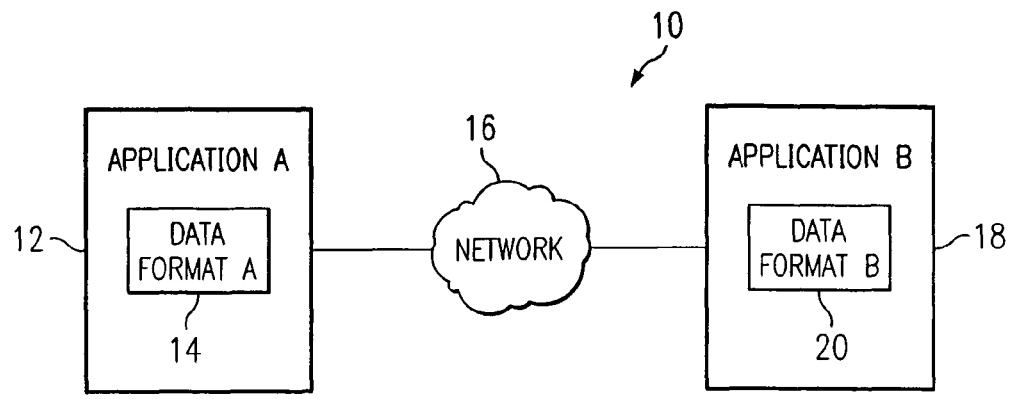
FIG. 1 illustrates an example system that may be used to implement one example embodiment of the present invention.
Figure 2:
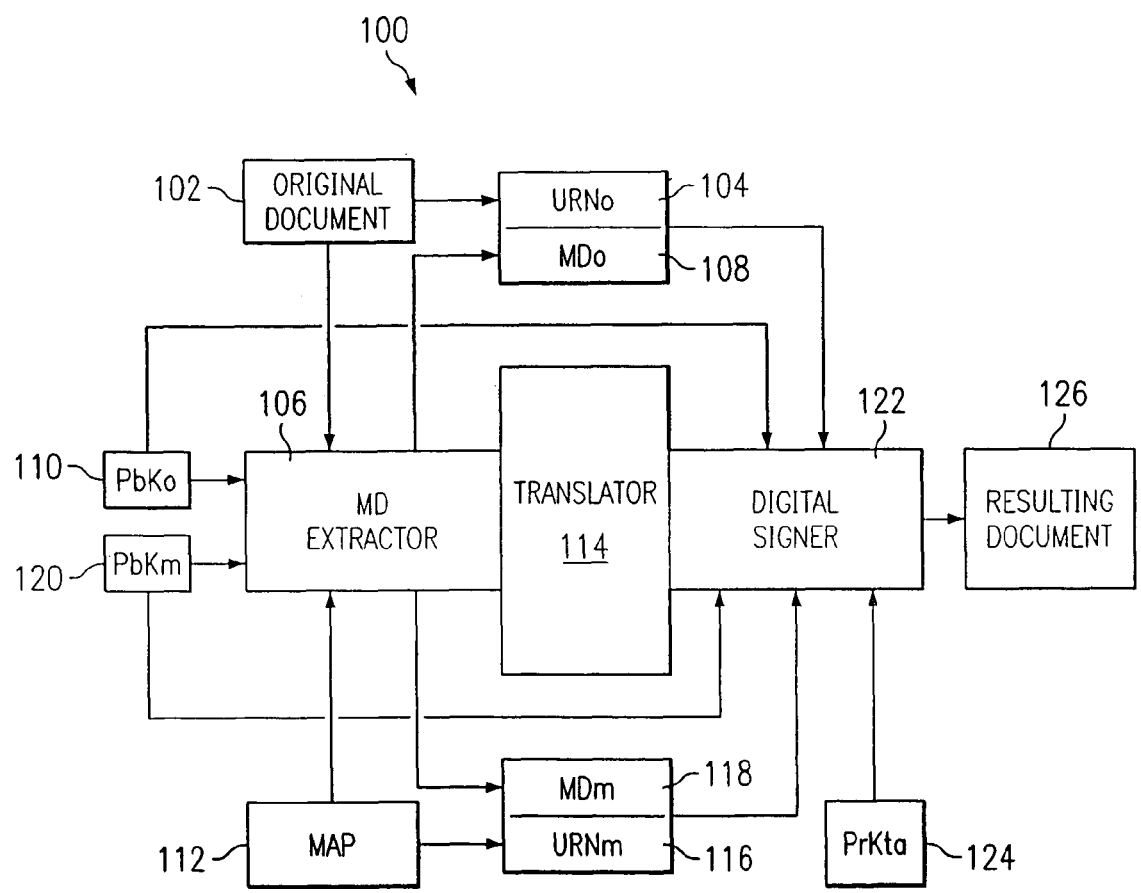
FIG. 2 illustrates an example non-repudiable translation unit that may be used to implement one example embodiment of the present invention.

The preferred embodiment of the present invention and its advantages are best understood by referring to FIGS. 1-3 of the drawings, like numerals being used for like and corresponding parts of the various drawings.

In accordance with one or more example embodiments of the present invention, a technique for non-repudiable translation of electronic documents is provided, whereby an original document that was translated can be non-repudiably identified, a map applied to the original document and used for the translation can be non-repudiably identified, a document resulting from the translation can be non-repudiably identified, and it can be demonstrated that the resulting, translated document was produced from the original document and map. Also, in accordance with one or more example embodiments, a technique for non-repudiable translation of electronic documents is provided, whereby a translation process that invoked a map against an original document to produce a resulting document may be non-repudiably identified, a time period when a translation process occurred may be non-repudiably identified, and an authority responsible for a translation process may be non-repudiably identified. Furthermore, in accordance with certain example embodiments, a technique for non-repudiable translation of electronic documents is provided, whereby a Universal Resource Name (URN), Message Digest Algorithm (MDA), and public keys of an original document and map may be digitally signed into a resulting, translated document. Also, an MDA of a translation process used, a date and time that a translation process occurred, and a digital certificate for a translating authority may be included in a resulting document.

FIG. 1 illustrates an example system 10 that may be used to implement one example embodiment of the present invention. System 10 includes a network 16 that couples a first computer application (e.g., Application A) 12 with a second computer application (e.g., Application B) 18. System 10 can enable performance of e-business transactions between Application A 12 and Application B 18. For example, Application A 12 may be a computer application executed in software by a processor at a first business entity's location, and Application B 18 may be a computer application executed in software by a processor at a second business entity's location.

Network 16 may include any suitable private and/or public network that can couple together two or more business entities together for e-business purposes. In an example embodiment, network 16 may include the Internet and/or any suitable Local Area Network (LAN), Metropolitan Area Network (MAN), or Wide Area Network (WAN) coupling one or more business entities (e.g., including Application A 12 and Application B 18) to the Internet. In a second example embodiment, network 16 may include a private network within one company coupling two computer applications (e.g., Application A 12 and Application B 18). In other words, the present invention is not intended to be limited to any particular type of network or other medium capable of coupling two or more business entities' computer applications (e.g., in an e-business environment). Preferably, at least two computer applications (e.g., Application A 12 and Application B 18) are coupled together for the purpose of transferring electronic documents from one application in a first data format (e.g., data format A 14) to a second application in a second data format (e.g., data format B 20).

FIG. 2 illustrates an example non-repudiable translation unit 100 that May be used to implement one example embodiment of the present invention. For example, translation unit 100 may be used in conjunction with Application A 12 (FIG. 1) for non-repudiably translating an original document in data format A 14 to a resulting document in data format B 20. Then, the resulting document may be transferred via network 16 (or other suitable communications medium) to Application B 18. As another example, translation unit 100 may be used in conjunction with Application B 18 for non-repudiably translating an original document in data format A 14 to a resulting document in data format B 20 (i.e., after the original document from Application A 12 has been transferred to Application B 18). As still another example, translation unit 100 may be used in conjunction with Application B 18 for non-repudiably translating an original document in data format B 20 to a resulting document in data format A 14. Then, the resulting document may be transferred via network 16 (or other suitable communications medium) from Application B 18 to Application A 12. As illustrated by these examples, the present invention is not intended to be limited to any particular location where non-repudiable translation may be performed. However, for practical design purposes, it may be preferable to implement unit 100 at the location where the original documents are produced. As such, non-repudiable translation unit 100 may be implemented in software, hardware or firmware, or any suitable combination thereof.

FIG. 3 illustrates an example method 200 that may be used for non-repudiable translation of electronic documents, in accordance with one example embodiment of the present invention. For example, method 200 may be implemented in software and executed by a processor used in conjunction with non-repudiable translation unit 100 of FIG. 2 and Application A 12 of FIG. 1. In this regard, at step 202, translation unit 100 retrieves an original document 102 (e.g., in data format A 14 from a suitable data storage location). At step 204, translation unit 100 determines a URN 104 for the original document 102. For this example, in accordance with Request For Comments (RFC) 2396, a URN may be defined as the persistent location of such a document (e.g., stored in an archive).

At step 206, translation unit 100 generates a digital signature for the original document 102 (e.g., using a private key associated with Application A 12). For example, a private key may be held exclusively by the owner of a document for use in encrypting and decrypting such a document and information related to such a document. A companion public key (e.g., key made available to the public for use in encryption and decryption) may be used to decrypt information encrypted with the private key. Conversely, a private key may be used to decrypt information encrypted with the companion public key.

As an optional step (included for technical reasons but not necessarily for implementing the present invention), an MD extractor 106 may be used to extract the MD of the original document 108 from the digital signature (e.g., by use of a public key 110). For this example, an MD may be a one-way hash value of the associated document (e.g., original document 102). An MD may be used to confirm that an original document has not been changed during translation, because if an original document is changed during translation, then the resulting MD will be different than the original MD. As such, for this example, a digital signature may be a private key encryption of an MD associated with the document from which the MD was produced. A corresponding public key may be used to decrypt the original MD and MDA applied to the original document, in order to confirm that the document has not changed. For one example embodiment, an MDA may be implemented using an MDS ALGOL®.

At step 208, translation unit 100 retrieves a map 112 used for translation of original document 102. For this example, map 112 may be a set of instructions executed by translator 114 (e.g., processor including computer program for performing translation). At step 210, translation unit 100 determines a URN 116 for the map 112. At step 212, translation unit 100 generates a digital signature for the map 112 (e.g., using a private key associated with Application A 12). As another optional step (again included for technical reasons but not necessarily for implementing the present invention), MD extractor 106 may be used to extract the MD of the map 118 from the digital signature (e.g., by use of a public key 120).

At step 214, translation unit 100 invokes translation of the original document 102. For this example, translator unit 100 may provide the original document 102 and the map 112 directly to translator 114 for execution of translation instructions (e.g., convert input document syntax to output document syntax according to map). As another alternative, MD extractor 106 may be used to feed the original document 102 and map 112 to translator 114 for execution of the translation instructions (e.g., if the above-described optional steps including the MD extractor 106 have been performed).

At step 216, translation unit 100 assembles into a document the translation, along with the digital signatures, URNs (e.g., 104, 116), and public keys (e.g., 110, 120) for the original document 102 and map 112. For example, translator 114 may assemble this document. Alternatively, this document may be assembled by a digital signer 122 (e.g., implemented by suitable software, hardware, etc.). At step 218, translation unit 100 digitally signs the assembled document (e.g., using a private key 124). For example, translator 114 or digital signer 122 may be used for digitally signing the assembled document. Notably, as an optional step, the MD for the original document 108 and the MD for the map 118 may also be assembled into the document before it is digitally signed (e.g., if the above-described optional steps including the MD extractor 106 have been performed). The digitally signed, resulting document 126 (including at least the translation, and the digital signatures, URNs, and public keys for the original document 102 and map 112) may be transferred to Application B 18.

As such, resulting document 126 includes sufficient information for a recipient to demonstrate non-repudiable translation. In other words, the resulting, digitally signed document 126 includes sufficient information for a recipient to demonstrate the ownership and relationship of the map and the original and translated documents, and digitally certifies (e.g., using digital signature with private key 124) to demonstrate that the map and original document have not been changed.

Additionally, if the above-described optional steps for the MD extractor 106 are performed, the MD of the resulting document may be extracted and reproduced to assure a recipient that the resulting information has not been changed. For example, a recipient may use the URN of the original document to reference the original document, extract the MD of the original document using the public key, and reproduce and compare the MD of the original document with the MD of the resulting document. In this way, a recipient may be assured that the original document has not been changed and was, in fact, the original document. If the original and resulting MDs do not match, then it may be inferred that the original document has been changed. Also, a recipient may use the URN of the map to reference the map, extract the MD of the map using the public key, and reproduce and compare the MD of the original map with the MD of the resulting map. In this way, a recipient may be assured that the original map has not been changed and was, in fact, the map used to produce the resulting document. If the original and resulting map MDs do not match, then it may be inferred that the original map has been changed. As a result of the above, the resulting document is non-repudiably tied to the referenced original document and map.

As yet another option (e.g., again included for technical reasons but not necessarily for implementing the present invention), in order to improve an electronic audit to be performed, additional information may be added to the resulting document (e.g., during an assembly step 216). For example, an MD and URN of the translator program may be added to the assembled document to identify the software that executed the map. Also, a time stamp indicating the time that a translation occurred may be added to the assembled document. Furthermore, a digital certificate may be added to the assembled document in order to identify the translation authority.

Certain embodiments of the present invention may provide one or more technical advantages. For example, certain embodiments of the present invention provide assurance that a translated electronic document can be non-repudiably tied to an original electronic document and a map used for the translation. Also, certain embodiments provide one or more techniques for non-repudiable translation of electronic documents that enable companies to more accurately communicate business information with e-business partners, customers and vendors than previous techniques. Furthermore, certain embodiments provide one or more techniques for non-repudiable translation of electronic documents, which enable companies to more efficiently and securely conduct commercial transactions than with previous translation techniques.

Although example embodiments of the present invention have been illustrated in the accompanying Drawings and described in the foregoing Detailed Description, it will be understood that the invention is not limited to any embodiment disclosed, but is capable of numerous rearrangements, modifications and substitutions without departing from the spirit of the invention as set forth and defined by the following claims.

What is claimed is:

1. A method for non-repudiable translation of documents, comprising:
   determining a storage location of a first document and a storage location of a map for translation of the first document;
   generating a first hash for the first document;
   generating a second hash for the map;
   producing a translation of the first document based on the map; and
   assembling a second document, the second document including the first hash, the second hash, the translation, the storage location of the first document, and the storage location of the map.

2. The method of claim 1, further comprising digitally signing the second document.

3. The method of claim 1, wherein the second document includes at least one encryption key associated with the first document.

4. The method of claim 1, wherein the second document includes at least one encryption key associated with the map.

5. The method of claim 1, wherein the second document includes a digital signature of the first document.

6. The method of claim 1, wherein the second document includes a digital signature of the map.

7. The method of claim 1, wherein the second document includes a third hash for a translator.

8. The method of claim 1, wherein the second document includes a value indicating a time the translating step was performed and a digital certificate for identifying a translation authority.

9. A system for generating non-repudiable translations of documents, the system comprising a processor suitable for executing an application associated with an entity and operable to:
   determine a storage location of a first document;
   generate a first hash for a first document stored at a first storage location;
   generate a second hash for translation instructions stored at a second storage location;
   produce a translation of the first document according to the translation instructions; and
   assemble a second document, the second document including the first hash, the second hash, the translation, the first storage location, and the second storage location.

10. The system of claim 9, wherein the application is further operable to digitally sign the second document.

11. The system of claim 9, wherein the second document includes at least one encryption key associated with the first document.

12. The system of claim 9, wherein the second document includes at least one encryption key associated with the translation instructions.

13. The system of claim 9, wherein the second document includes a digital signature of the first document.

14. The system of claim 9, wherein the second document includes a digital signature of the translation instructions.

15. The system of claim 9, wherein the second document includes a third hash for a translator.

16. The system of claim 9, wherein the second document includes a value indicating a time the translating step was performed and a digital certificate for identifying a translation authority.

* * * * *